United States Patent [19]
Ishikawa

[11] Patent Number: 5,956,472
[45] Date of Patent: Sep. 21, 1999

[54] DATA PROCESSING METHOD AND DATA PROCESSING APPARATUS AND PRINTER USING DATA PROCESSING APPARATUS

[75] Inventor: Hisashi Ishikawa, Yokohama, Japan

[73] Assignee: Canon Kabushiki Kaisha, Tokyo, Japan

[21] Appl. No.: 08/888,814

[22] Filed: Jul. 7, 1997

[30] Foreign Application Priority Data

Jul. 9, 1996 [JP] Japan .................................. 8-179365

[51] Int. Cl.⁶ .................................................. G06K 15/00
[52] U.S. Cl. .......................................... 395/115; 395/116
[58] Field of Search ..................... 395/101, 115,
395/116, 842, 846–848, 872–873, 876;
345/520, 521, 507, 509, 515, 196, 516,
517, 518, 203; 358/404, 444

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 5,812,283 | 9/1998 | Tachibana et al. ..................... 395/116 |
| 5,821,974 | 10/1998 | Iga et al. ................................ 395/116 |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |

*Primary Examiner*—Arthur G. Evans
*Attorney, Agent, or Firm*—Fitzpatrick, Cella, Harper & Scinto

[57] ABSTRACT

A data processing method and apparatus and printer capable of performing an HV conversion by using a single buffer. The data buffer has a length of N×M (=H) words and a width of N lines. First image data for H words/line is written into the data buffer for N lines. Then, the image data is read from the buffer by N pixels in a buffer widthwise direction for M words in a buffer lengthwise direction, and data for N×M words, is written in the area of the buffer, which has become available by the reading. These writing and reading operations are performed with respect to the entire area of the data buffer (mode A). Next, the image data is read by one pixel at M-word intervals in the buffer lengthwise direction. When data for one line has been read out, data for one line is written into the area which has become available by the reading in the buffer-lengthwise direction (mode B). Hereinafter, data input/output operation is performed by changing the mode A and the mode B.

17 Claims, 11 Drawing Sheets

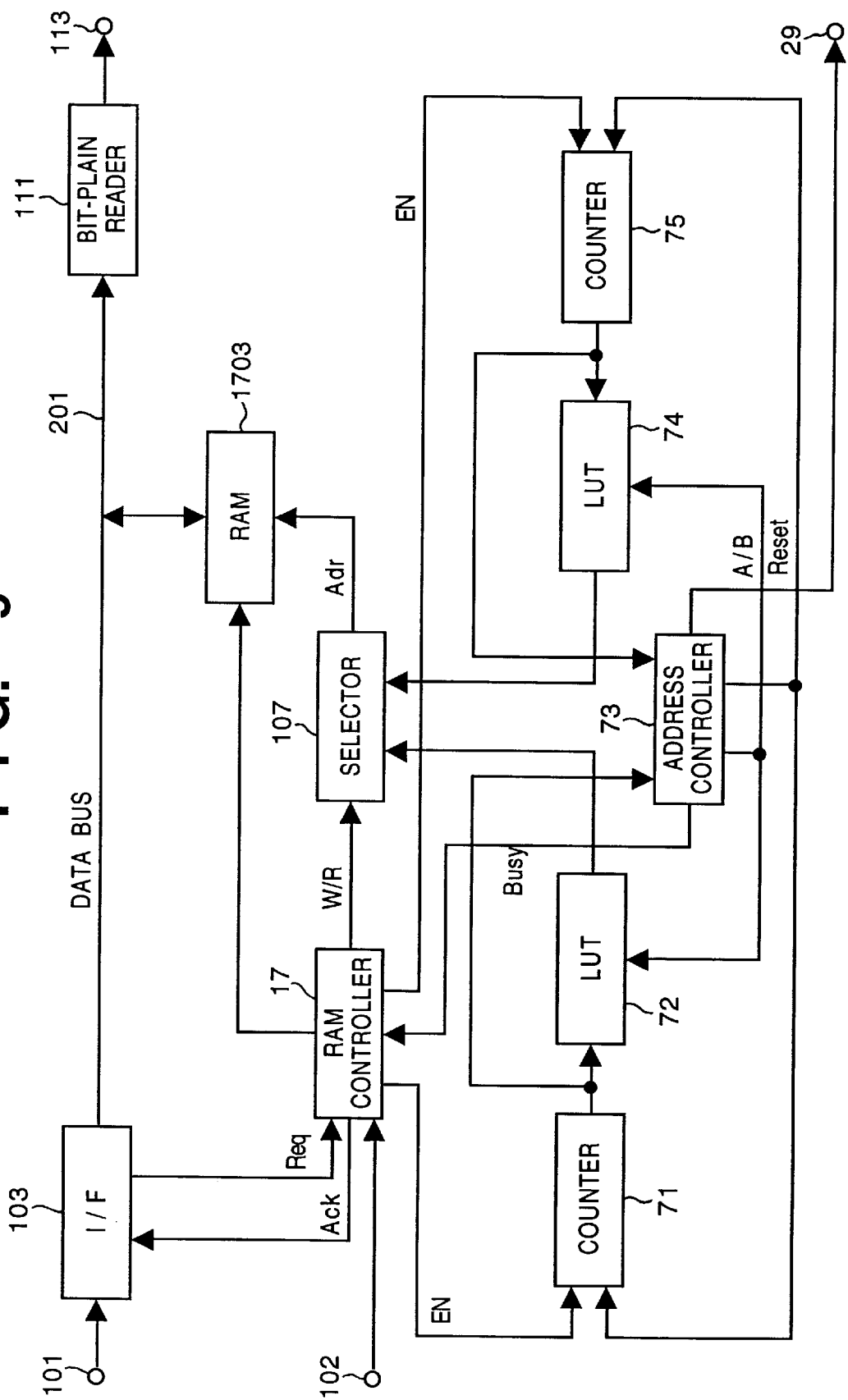

DATA PROCESSING METHOD AND DATA PROCESSING APPARATUS AND PRINTER USING DATA PROCESSING APPARATUS

BACKGROUND OF THE INVENTION

This invention relates to a data processing method, more particularly to a data processing method, a data processing apparatus and a printer using the data processing apparatus which converts the format of image data upon data input/output.

Conventional serial printers have improved throughput by increasing the number of dots which can be printed at one time. For example, in a printer which performs printing in accordance with an ink-jet printing method, nozzles which discharge ink are arrayed in a direction (subscanning direction) orthogonal to a scanning direction (main-scanning direction) of a printhead so that a plurality of lines can be printed by one scanning of the printhead, thereby the throughput is improved. On the other hand, as image data where generally pixels are arranged in the main-scanning direction is sequentially inputted from a host computer (hereinafter referred to as "host"), the printer side is required to change the array of the input print data in accordance with the construction of the printhead (hereinafter referred to as "HV conversion").

One typical HV conversion method is the double-buffer method using two separate buffers. In this method, upon writing/reading image data, one buffer is used for writing while the other buffer is used for reading. Then, when the writing/reading has been completed, the purposes of the buffers are interchanged; i.e., the former buffer is used for reading while the latter buffer is used for writing.

FIGS. 10A to 10C show the concept of the HV conversion using the double-buffer method.

As shown in FIG. 10A, image data in a format where image data are arranged in the main-scanning direction, transferred from the host, is written into a buffer A in line units. When image data for a predetermined number of lines (the number of nozzles) has been written in the buffer A, subsequent image data is written into a buffer B in line units, while the image data from the buffer A is sequentially read in column units, in a format where image data are arranged in the subscanning direction, as shown in FIG. 10B. When the reading of the image data from the buffer A has been completed and image data for the predetermined number of lines (the number of nozzles) has been written in the buffer B, image data in the format where image data are arranged in the main-scanning direction, transferred from the host, is written into a buffer A in line units, while the image data from the buffer B is sequentially read in column units, in the format where image data are arranged in the subscanning direction, as shown in FIG. 10C. When the reading of the image data from the buffer B has been completed and image data for the predetermined number of lines (the number of nozzles) has been written in the buffer A, image data is written into the buffer B, while the image data is read from the buffer A, as shown in FIG. 10B.

The above operation as shown in FIGS. 10B and 10C is repeated until the all image data has been outputted for printing an image on a print medium such as a print sheet.

FIG. 11 is a block diagram showing the construction of an HV converter which performs HV conversion by using the conventional double-buffer method. In this example, the HV conversion is performed by using one RAM. That is, the buffers A and B as described in FIGS. 10A to 10C are allocated in the RAM.

In the HV converter in FIG. 11, when an interface (I/F) circuit 103 receives image data from an input terminal 101, the I/F circuit 103 outputs a request signal (Req) to a controller 104. The controller 104 receives the request signal, and if it is possible to store the image data into the RAM 109, outputs an acknowledge signal (Ack) to the I/F circuit 103, then controls a selector 107 such that the value of a counter 105 is outputted to an address bus of the RAM 109, thus sets the RAM 109 into a writing mode.

The I/F circuit 103 receives the acknowledge signal, outputs the image data onto a data bus 201, and stops the output of the request signal. The controller 104 confirms that the output of the request signal has stopped, then terminates the input of data in the RAM 109, and increments the count value of the counter 105. A selector 106 outputs a start address A when writing image data into the buffer A (in buffer A mode), into the counter 105, while outputs a start address B when writing image data into the buffer B (in buffer B mode), into the counter 105, in accordance with a mode signal (MODE) from the controller 104. When a buffer used for storing image data is changed, the counter 105 loads the start address outputted from the selector 106, in accordance with a load signal (LOAD) from the controller 104. Accordingly, when image data is written into the buffer A, the image data is stored from the start address A, while when image data is written into the buffer B, the image data is stored from the start address B.

On the other hands when a read pulse is inputted from an input terminal 102, the controller 104 controls the selector 107 such that the value of an address generator 108 is outputted onto the address bus of the RAM 109 if the RAM 109 is not in the writing mode, then reads data stored in the RAM 109, stores the read data into a bit-plane reader 111 via the data bus 201, and increments the count value of a counter 112. When the count value has been incremented N times, the counter 112 outputs a carry signal (Carry). Upon inputting the read pulse, when the RAM 109 is in the writing mode, the above operation is performed after the writing into the RAM 109 has been completed. The bit-plane reader 111 has two buffers (double buffer) each having a capacity (word) equal to the number of nozzles (N) of the printhead× one word length of the RAM 109. The bit-plane reader 111 executes the HV conversion within the word, and at the same time, outputs data from an output terminal 113 in synchronization with a clock.

Note that one word length of the RAM 109 is defined as a data length read from the RAM by specifying one address.

The counter 110 and the counter 112 are reset by the load signal (Load) from the controller 104 when the buffer A mode and buffer B mode are changed over. The counter 112 counts from "0" to "N−1" (i.e., N times) by an enable signal (EN) from the controller 104, and if the enable signal is inputted when the count value is "N−1", outputs the carry signal (Carry) to the counter 110, to increment the count value of the counter 110. The address generator 108 generates an access address (Adr) to the RAM 109 based on the count values of the counters 110 and 112, and outputs the access address to the selector 107. For example, assuming that the count value of the counter 110 is "x", the count value of the counter 112 is "y", the number of words in one line is "H", the start address of the buffer A is "$A_0$", and the start address of the buffer B is "$B_0$", the address (Adr) of the RAM 109 is:

Adr=x+H·y+$A_0$ (buffer A write mode)

Adr=y+H·x+$B_0$ (buffer B read mode)

The address generator 108 calculates the address Adr from the values x and y obtained from the counters 110 and 112, and outputs the address Adr to the selector 107.

The controller 104 inputs the count output from the counter 105 and the output from the address generator 108. The controller 104 detects the processing status of the respective buffers by comparing the input values with a predetermined address. When the processing in both buffers has been completed, the writing mode and reading mode of the respective buffers are changed over. That is, in a case where image data is written into the buffer A while image data is read from the buffer B, when the last data addresses have been accessed in both buffers, the next writing operation is performed with respect to the buffer B while the next reading operation is performed with respect to the buffer A.

In this manner, the writing and reading are performed by using two buffers alternately, so that the image-data input processing and image-data output processing can be performed in parallel, which attains smooth data processing.

However, as the above conventional technique requires two buffers for writing and reading image data, the memory requirement is twice of that for one-scan printing by the printhead. This increases the size and cost of the circuit.

SUMMARY OF THE INVENTION

Accordingly, it is an object of the present invention to provide a data processing method and data processing apparatus and a printer using the data processing apparatus which enables an HV conversion by using one buffer.

According to one aspect of the present invention, the foregoing object is attained by providing a data processing method for executing data processing of inputting/outputting to/from a data buffer, whose size is H pixels in a first direction and L lines in a second direction, storing image data for H pixels×L lines, comprising: an initial write-in step of storing image data into the data buffer by H pixels along the first direction for L lines; a first read-out step of reading the image data from the data buffer by L pixels along the second direction by a predetermined number of pixels in the first direction; a first write-in step of storing image data into an area of the data buffer, which has become available by the reading operation at the first read-out step, by the predetermined number of pixels along the first direction for L lines; a first repetition control step of controlling repetition of the first read-out step and the first write-in step until the reading operation at the first read-out step and writing operation at the first write-in step have been completed with respect to an entire area of the data buffer; a second read-out step of reading the image data from the data buffer at intervals of the predetermined number of pixels along the first direction; a second write-in step of storing image data into the data buffer along the first direction for one line; and a second repetition control step of controlling repetition of the second read-out step and the second write-in step until the reading operation at the second read-out step and the writing operation at the second write-in step have been completed with respect to the entire area of the data buffer.

According to another aspect of the present invention, the foregoing object is attained by providing a data processing apparatus for executing data processing of inputting/outputting to/from a data buffer, whose size is H pixels in a first direction and L lines in a second direction, storing image data for H pixels×L lines, comprising: initial writing means for storing image data into the data buffer by H pixels along the first direction for L lines; first read-out means for reading the image data from the data buffer by L pixels along the second direction by a predetermined number of pixels in the first direction; first write-in means for storing image data into an area of the data buffer, which has become available by reading operation by the first read-out means, by the predetermined number of pixels along the first direction for L lines; first repetition control means for controlling repetition of the first read-out means and the first write-in means until the reading operation by the first read-out means and writing operation by the first write-in means have been completed with respect to an entire area of the data buffer; second read-out means for reading the image data from the data buffer at intervals of the predetermined number of pixels along the first direction; second write-in means for storing image data into the data buffer along the first direction for one line; and second repetition control means for controlling repetition of the second read-out means and the second write-in means until the reading operation by the second read-out means and the writing operation by the second write-in means have been completed with respect to the entire area of the data buffer.

According to still another aspect of the present invention, the foregoing object is attained by providing a printer using the above data processing apparatus, comprising: input means for inputting image data in which pixels are arranged in the first direction; a printhead in which L print elements are arranged in the second direction; scan means for scanning the printhead in the first direction; conveyance means for conveying a print medium in the second direction; change means for changing a first mode for activating the first read-out and write-in means, and a second mode for activating the second read-out and write-in means; and change control means for controlling the change means so as to change the first and second modes at each scan by the scan means.

In accordance with the present invention as described above, in the data input/output processing to/from a data buffer, having a capacity of H pixels in a first direction and L lines in a second direction, for storing data for H pixels×L lines, first, image data is stored in the data buffer by H pixels along the first direction for L lines. Next, at the first read-out step, the image data is read from the data buffer by L pixels along the second direction, for a predetermined number of pixels in the first direction. At the first write-in step, the next image data is stored into the area of the data buffer, which has become available by the reading at the first read-out step, by the predetermined number of pixels in the first direction for L lines. The first read-out step and the first write-in step are repeated until the reading operation at the first read-out step and the writing operation at the first write-in step with respect to the entire area of the data buffer have been completed. Further, at the second reading step, the image data is read from the data buffer, at intervals of a predetermined number of pixels along the first direction. At the second write-in step, image data is stored into the data buffer for one line along the first direction. At this time, the second read-out step and the second write-in step are repeated until the reading operation at the second read-out step and the writing operation at the second write-in step with respect to the entire area of the data buffer have been completed.

Further, it may by arranged such that the first read-out and write-in steps and repeating of these steps, and the second read-out and write-in steps and repeating of these steps, are repeated until input/output processing of image data of a predetermined amount has been completed.

Note that the above predetermined number of pixels may be H/L.

Further, the address for accessing to the data buffer at the first read-out and write-in steps and the second read-out and write-in steps may be determined by using a plurality of counters or a look-up table.

Further, it may be arranged such that upon writing image data into the data buffer at the first and second write-in steps, if continuous operation based on the image data is not necessary, blank data is written into a specific area of the data buffer, then at the first and second read-out steps, if continuous operation based on the image data is not necessary, the blank data is read by accessing the specific area, as an alternative operation.

Further, it may be arranged such that a write address of subsequent image data is generated from the difference between the current image data and the previous image data, and a read address of the subsequent image data is generated from the difference between the previous image data and the current image data.

Further, it may be arranged such that a counter for counting the number of read pixels of the image data is employed at the first and second read-out steps, and the count value of the counter is converted into a read address of the data buffer by using a look-up table.

In a case where the data processing apparatus employing the above method is used in a printer that performs printing by using a printhead where L printing elements are arrayed in the second direction, a first mode for performing operation corresponding to the first read-out and write-in steps and a second mode for performing operation corresponding to the second read-out and write-in steps are changed at every scanning of the printhead in the first direction.

The printhead may be an ink-jet printhead which performs printing by discharging ink, or a printhead which discharges ink by utilizing thermal energy, with thermal-energy generators for generating thermal energy to be provided to ink.

The present invention is particularly advantageous since Hv conversion similar to the conventional double-buffer method can be performed by using a single data buffer for storing image data for H pixels×L lines. The HV conversion is performed by alternately changing two access methods with respect to the data buffer at each input/output of data having an amount corresponding to the capacity (H pixels×L lines) of the buffer.

This realizes the HV conversion with less buffer capacity, contributing cost reduction and circuit downsizing.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a block diagram showing the construction of the HV converter according to a fifth embodiment;

DETAILED DESCRIPTION OF THE PREFERRED EMBODIMENTS

Preferred embodiments of the present invention will now be described in detail in accordance with the accompanying drawings.

First Embodiment

<General Description of Main Unit of Printer>

Figure 1:
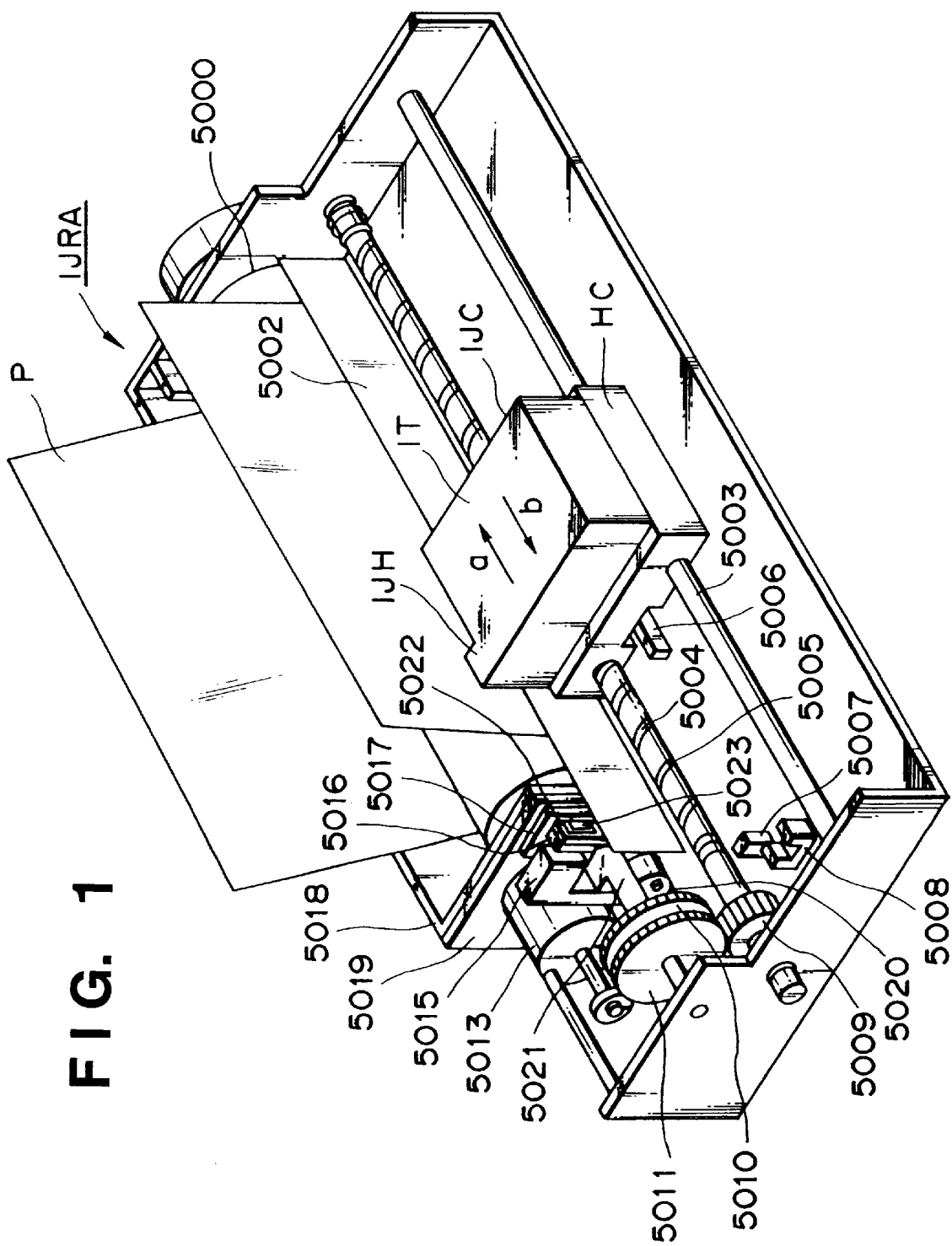
FIG. 1 is a perspective view showing the structure of an ink-jet printer IJRA which is a typical embodiment of the present invention.

FIG. 1 is a perspective view showing the structure of an ink-jet printer IJRA as a typical embodiment of the present invention. In FIG. 1, a carriage HC is engaged with a spiral groove 5004 of a lead screw 5005 which rotates via drive force transmission gears 5009 to 5011 interlocking with forward/reverse rotation of a drive motor 5013. The carriage HC has a pin (not shown) and it is reciprocally moved in directions represented by arrows a and b, held by a guide rail 5003. The carriage HC has an ink-jet cartridge IJC which integrally comprises a printhead IJH and an ink tank IT. A paper holding plate 5002 presses a print sheet P against a platen 5000 along the moving direction of the carriage HC. Photocouplers 5007 and 5008 are home position detecting members for confirming the existence of lever 5006 of the carriage in this area and changing over the rotational direction of motor 5013. A support member 5016 supports a cap member 5022 for capping the front surface of the printhead IJH. A suction member 5015 performs suction-restoration of the printhead by sucking the inside of the cap member 5022 via a cap inner opening 5023. Member 5019 allows a cleaning blade 5017 to move in a back-and-forth direction. A main body support plate 5018 supports the member 5019 and the cleaning blade 5017. It is apparent that any well-known cleaning blade is applicable to the printer of the embodiments. Numeral 5021 denotes a lever for starting the sucking operation of the suctionrestoration. The lever 5021 moves along the movement of a cam 5020 engaged with the carriage HC. A well-known transmission mechanism such as change-over of a clutch controls a drive force from the drive motor.

When the carriage HC is at the home position area, a desired one of these capping, cleaning and suction-restoration is executed at its corresponding position by the lead screw 5005. Any of these processing is applicable to the printer, if a desired processing is performed at a well-known timing.

Further, in the printhead IJH, N printing elements for discharging ink are arrayed in a print-sheet conveying direction.

<Construction of Controller>

Next, the construction of a controller for executing print control of the above printer will be described.

Figure 2:
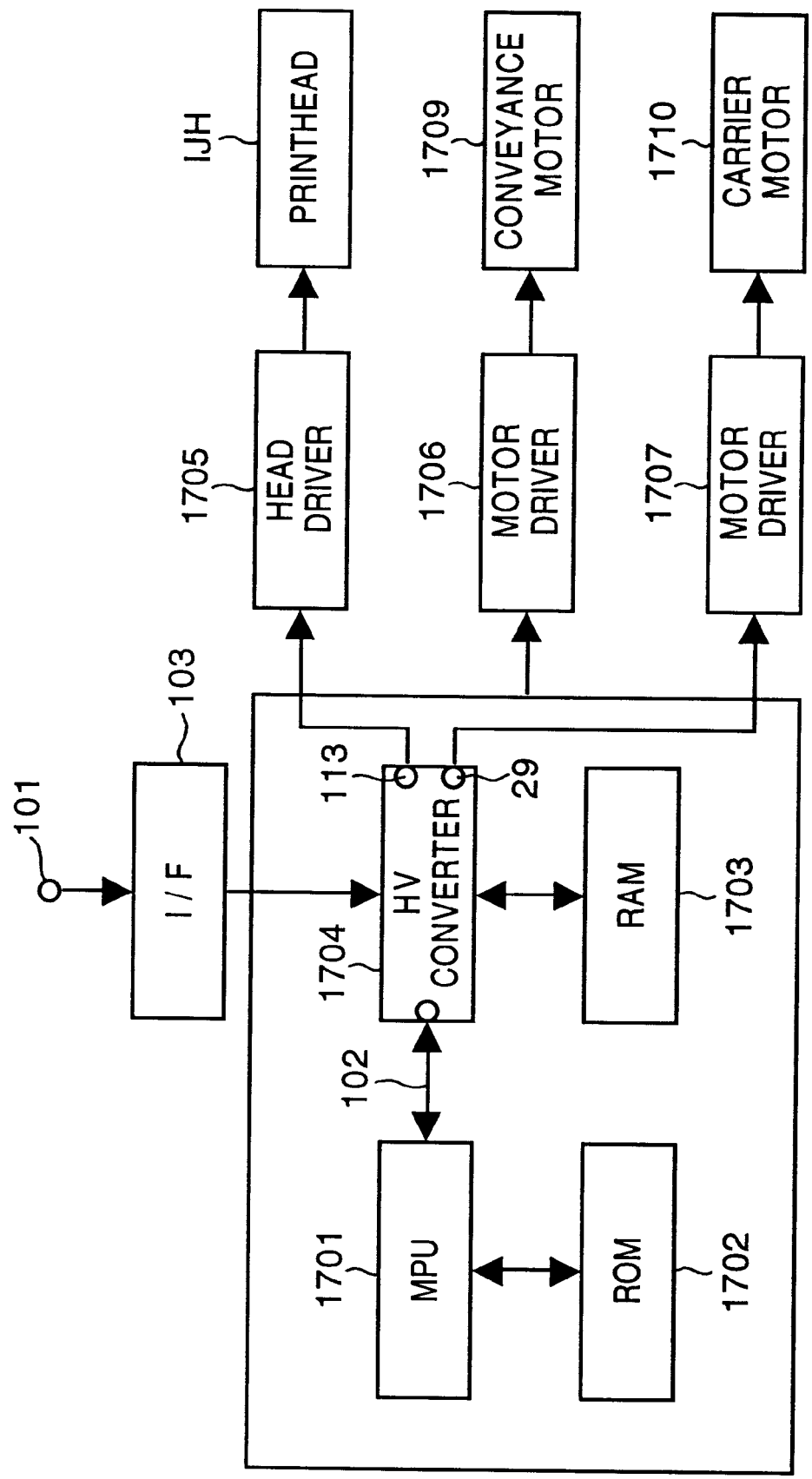
FIG. 2 is a block diagram showing the construction of a controller of the ink-jet printer IJRA.
Figure 11:
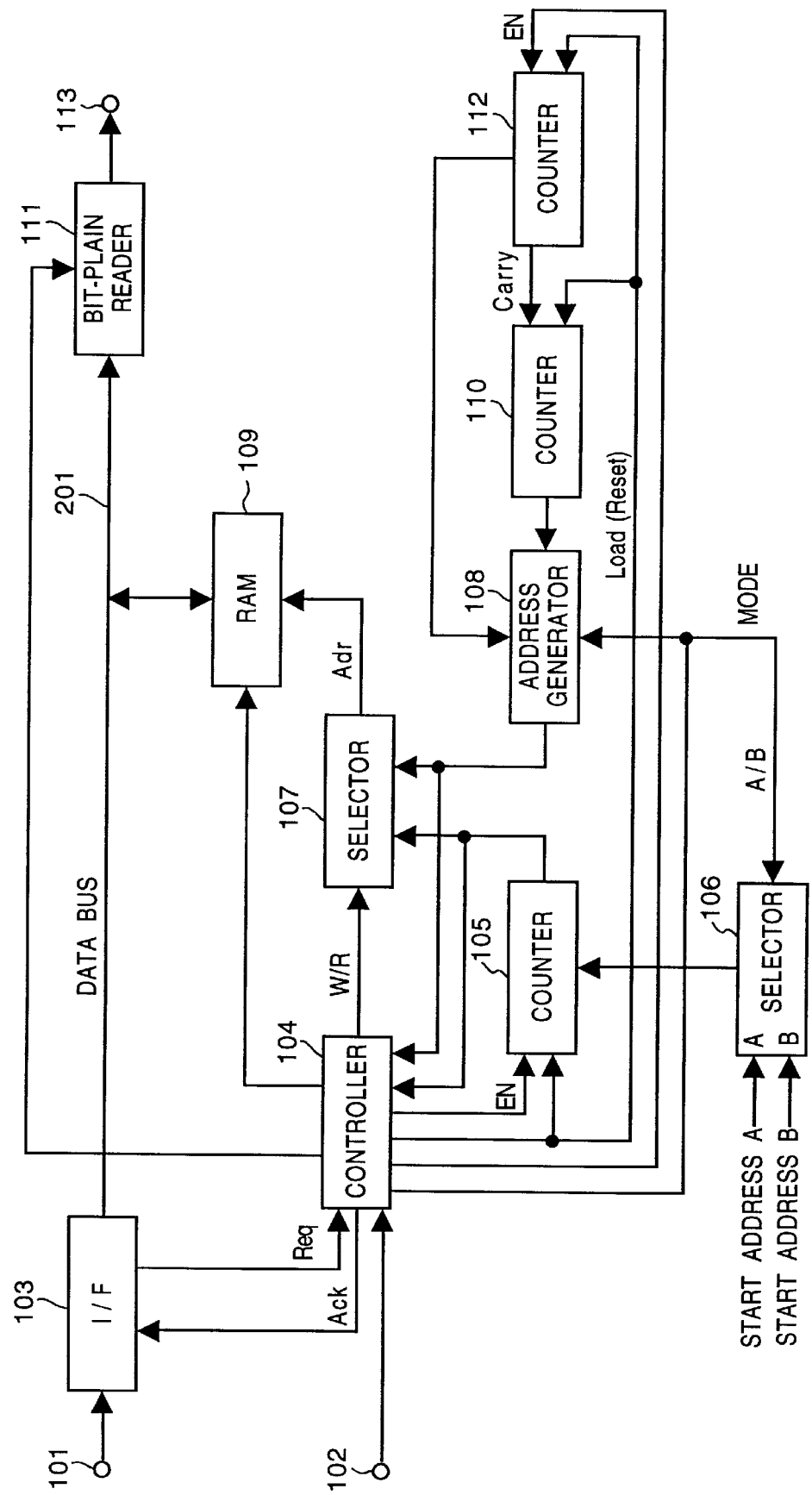
FIG. 11 is a block diagram showing the construction of the conventional HV converter.

FIG. 2 is a block diagram showing the construction of a control circuit of the ink-jet printer IJRA. Referring to FIG. 2 showing the control circuit, elements corresponding to those in FIG. 11 have the same reference numerals and explanation of these elements will be omitted. Reference numeral 1701 denotes an MPU; 1702, a program ROM for storing control programs executed by the MPU 1701; and 1703, a RAM for storing various data (input image data, print data supplied to the printhead IJH and the like); and 1704, an HV converter for performing HV conversion. Reference numeral 1710 denotes a carrier motor for transferring the printhead IJH; 1709, a conveyance motor for conveying the print sheet; 1705, a head driver for driving the printhead IJH; and 1706 and 1707, motor drivers for driving the conveyance motor 1709 and the carrier motor 1710.

In the RAM 1703, a buffer for storing data corresponding to image data used in printing by one scanning of the printhead IJH is allocated. The buffer logically has, as an image-data storage area, a rectangular area having a buffer length (LP) corresponding to the maximum number of pixels of image data for one-scanning printing of the printhead IJH, and a buffer width (WP) corresponding to the number of printing elements arrayed in the print-sheet conveying direction.

The operation of the above control arrangement will be described below. When image data is inputted into the I/F circuit 103, the HV converter performs HV conversion on the image data and outputs the HV-converted image data to the head driver 1705, by an instruction from the MPU 1701. The motor drivers 1706 and 1707 are driven, and the printhead IJH is driven in accordance with the image data supplied to the head driver 1705, thus performing the printing operation.

Figure 3:
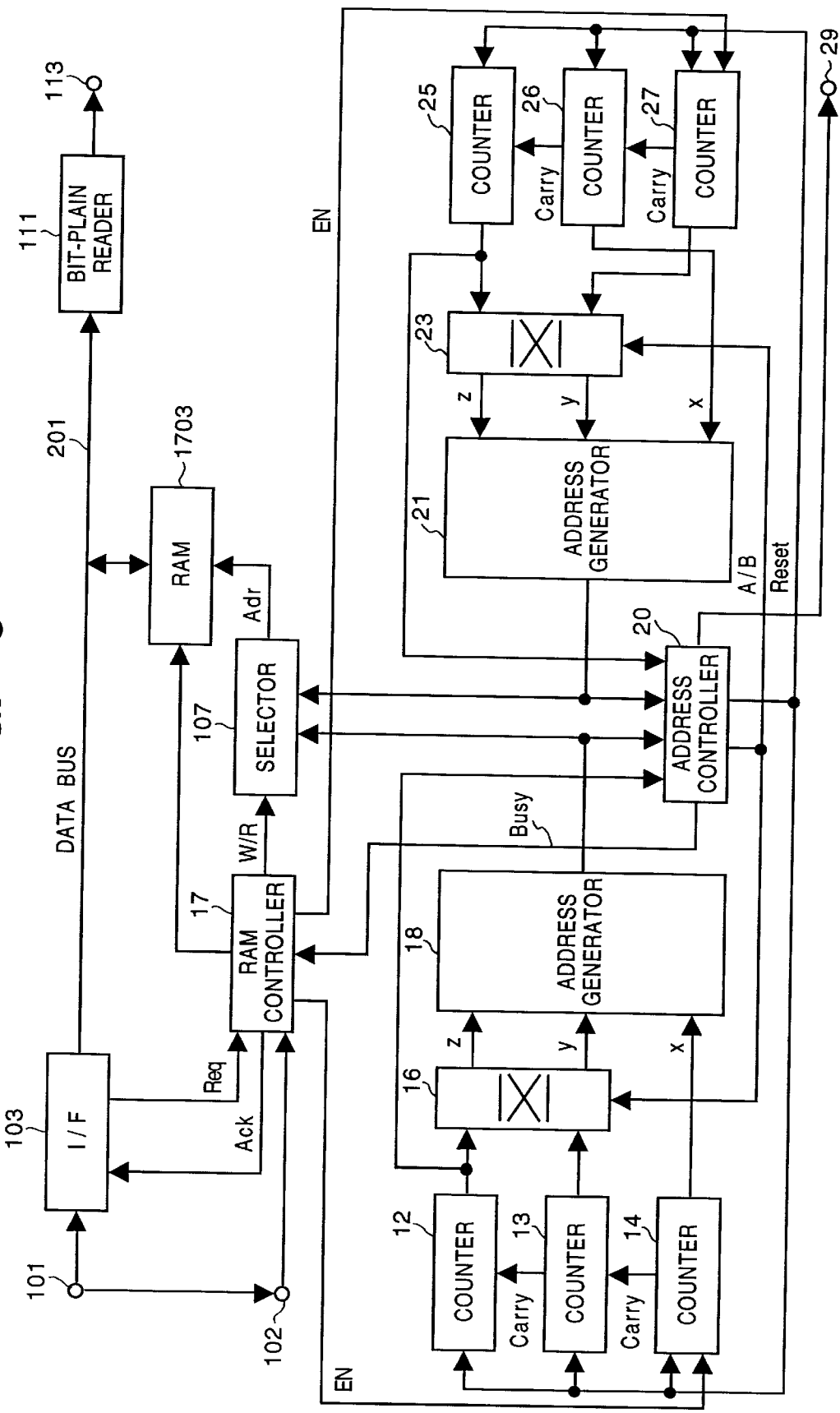
FIG. 3 is a block diagram showing the detailed construction of an HV converter.

FIG. 3 is a block diagram showing the detailed construction of the HV converter 1704. In FIG. 3, the elements corresponding to those in FIG. 11 have the same reference numerals and explanation of these elements will be omitted. As it is understood in comparison with FIG. 2, the elements in FIG. 3 except the interface (I/F) circuit 103 and the RAM 1703 are constituents of the HV converter 1704.

In FIG. 3, numerals 12 and 25 denote counters; 13 and 27, counters which output a carry signal (Carry) when count-value increment has been made N times; 14 and 26, counters which output a carry signal (Carry) when count-value increment has been made M times; 16 and 23, matrix switches; 17, RAM controller; 18 and 21, address generators; and 20, an address controller.

In the above description, as assumed in the description of the conventional technique, the number of words in one line (a value obtained by dividing buffer length (LP) by the one word length of the RAM 1703) is "H", the number of lines of image data which can be stored in the buffer is "N" (equal to buffer width (WP)), and the number obtained by dividing the number of words "H" by the number of lines "N" (in this case, a value is rounded up to be an integer) is "M". Further, the number of words (H) in one line and the number of pixels (V) of the maximum print length in the print-sheet conveying direction are integral multiples of the number of lines (N) of the buffer (i.e., H=N×M; V=n×N; n: natural numbers).

Note that the value of V is determined in accordance with an effective length in the print-sheet conveying direction of a print medium and a print resolution of the printhead IJH.

First, when the I/F circuit 103 receives image data from the input terminal 101, the I/F circuit 103 outputs a request signal (Req) to the RAM controller 17. The RAM controller 17 receives the request signal, and in response to the received request signal, if data can be stored into the buffer of the RAM 1703, outputs an acknowledge signal (Ack) to the I/F circuit 103, and controls the selector 107 such that the output from the address generator 18 is outputted onto the address bus of the RAM 1703, thus sets the RAM 1703 in a writing mode.

On the other hand, the interface (I/F) circuit 103 receives the acknowledge signal, outputs the image data onto the data bus 201, and stops output of the request signal. The RAM controller 17 confirms that the output of the request signal has been stopped, terminates the data storage into the RAM 1703, increments the count value of the counter 14, and stops output of the acknowledge signal.

When a read pulse is inputted from the MPU 1701 via the input terminal 102, if the RAM 1703 is not in the writing mode, the RAM controller 17 controls the selector 19 such that the output from the address generator 21 is outputted onto the address bus of the RAM 1703, reads the image data stored in the RAM 1703, then stores the data into the buffer of the bit-plane reader 111 via the data bus 201, and at the same time, increment the count value of the counter 27. On the other hand, if the RAM 1703 is in the writing mode, the RAM controller 17 performs the above operation after writing into the RAM 1703 has been completed. The bit-plane reader 111, having a double-buffer structure as described in FIG. 11, executes the HV conversion within one word, and at the same time, outputs image data from the output terminal 113 in synchronization with the clock.

The count values of the counters 12 and 25, the counters 13 and 27, and the counters 14 and 26 are reset by a reset signal (Reset) from the address controller 20, upon changing modes A and B respectively described in detail later.

The counter 14 counts M times from "0" to "M−1" by an enable signal (EN) from the RAM controller 17. If the enable signal is inputted when the count value is "M−1", the counter 14 outputs a carry signal (Carry) to the counter 13, to increment the count value of the counter 13. The counter 13 counts N times from "0" to "N−1" by the carry signal (Carry) from the counter 14. If the carry signal is inputted when the count value is "N−1", the counter 13 outputs a carry signal to the counter 12, to increment the count value of the counter 12.

The count values of the counters 12 and 13 are outputted to the address generator 18 via the matrix switch 16. The matrix switch 16 switches the count values of the counters 12 and 13 in each mode and outputs the switched count values. For example, in the mode A, the matrix switch 16 outputs the count value of the counter 13 from an output terminal y, and outputs the count value of the counter 12 from an output terminal z; in the mode B, the matrix switch 16 outputs the count value of the counter 13 from the output terminal z, and outputs the count value of the counter 12 from the output terminal y.

The address generator 18 generates an access address for the RAM 1703, based on the count value (x) of the counter 14 and the output values from the output terminals y and z (respectively, output values y and z) of the matrix switch 16, and outputs the access address to the selector 107. Assuming that the start address of the buffer is "$A_0$", the access address (Adr) to be generated is expressed by:

$$Adr = x + H \cdot y + M \cdot z + A_0 \qquad (1)$$

Note that as H=N×M, $0 \leq x \leq M-1$ and $0 \leq y \leq N-1$ hold, when N=$2^n$ and M=$2^m$ hold, and all the values of the lower bits (n+m) of the address A0 are "0", the address generator 18 can be constructed with mere bit-merge (i.e., only by wiring). Note that the bit-merge is performed such that an input bit sequence is changed according to the wiring in the address generator and bit sequence subjected to the change is outputted. Further, even though the above condition is not satisfied, if the RAM 1703 has a sufficiently large capacity, the address generator 18 may be constructed with the bit merge. At this time, the values H and M in expression (1) are rounded up to a power of 2. The address generator 18 may be constructed with a look-up table (LUT) or an arithmetic circuit.

The counter 27 counts N times from "0" to "N−1" by an enable signal (EN) from the RAM controller 17. If the enable signal is inputted when the count value is "N−1", the counter 27 outputs a carry signal (Carry) to the counter 26, to increment the count value of the counter 26. The counter 26 counts M times from "0" to "M−1" by the carry signal from the counter 27. If the carry signal is inputted when the count value is "M−1", the counter 26 outputs a carry signal (Carry) to the counter 25, to increment the count value of the counter 25. The count values of the counters 25 and 27 are outputted to the address generator 21 via the matrix switch 23. The matrix switch 23 switches the count values of the counters 25 and 27 in each mode. For example, in the mode A, the matrix switch 23 outputs the count value of the counter 27 from an output terminal y, and outputs the count value of the counter 25 from an output terminal z; in the mode B, the matrix switch 23 outputs the count value of the counter 27 from the output terminal z, and outputs the count value of the counter 25 from the output terminal y.

The address generator 21 generates an access address for the RAM 1703 based on the count value (x) of the counter 26 and the outputs (y and z) from the output terminals y and z of the matrix switch 23, and outputs the access address to the selector 107. Note that address generator 21 has the same construction as that of the address generator 18.

The address controller 20 inputs the count outputs from the counters 12 and 25 and the outputs from the address generators 18 and 21. Normally, the address controller 20 performs control such that the count value of the counter 12 does not coincide with the count value of the counter 25. That is, when the values of the counters 12 and 25 coincide, the address controller 20 outputs a busy signal (Busy) to the RAM controller 17 and stops writing into the RAM 1703. When the reading from the RAM 1703 has been advanced and the count value of the counter 25 has been incremented, the address controller 20 stops the output of the busy signal and restarts the writing. On the other hand, when the output of the address generator 21 reaches the end address of the buffer, the address controller 20 outputs a busy signal (Busy) to the motor driver 1707 via an output terminal 29, to instruct the motor driver 1707 to stand by immediately before the next scanning operation of the carriage HC. Note that at this time, even if the count values of the counters 12 and 25 coincide, the address controller 20 does not output the busy signal to the RAM controller 17. Next, when the output of the address generator 18 reaches the end address of the buffer, the address controller 20 stops the output of the busy signal to the motor driver 1707, to instruct the motor driver 1707 to start the next scanning operation of the carriage HC, resets the counters 12 and 25, the counters 13 and 27 and the counters 14 and 26, thus changing the mode.

Note that in a case where the input/output address control with respect to the buffer allocated in the RAM 1703 is realized by software, it may be arranged such that instead of using the counters 12 to 14 and 25 to 27 and the address generators 18 and 21, the initial values of the respective counters are set in predetermined areas of the RAM 1703, and an address is generated by cumulatively adding increments to the initial values. Further, in a case where the address generators 18 and 21 are respectively constructed with an LUT, it may be arranged such that, regarding areas other than areas holding image data, the same address is always accessed. In this case, a value "0" may be stored in the area of the corresponding address of the RAM 1703 in advance.

Figure 4A:
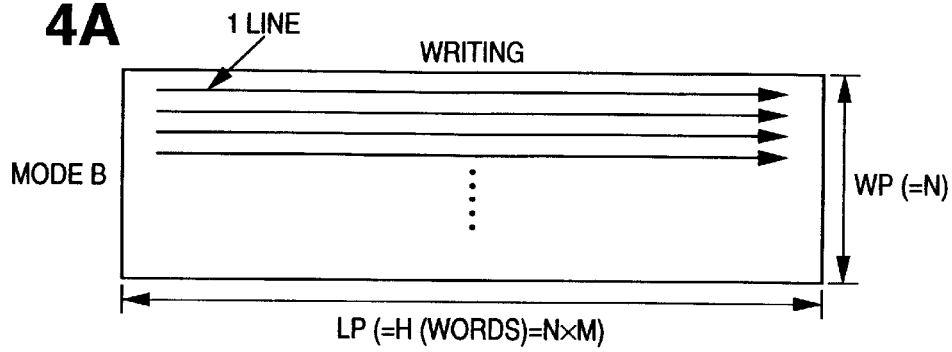
FIGS. 4A to 4E are explanatory views showing access to a buffer by the HV converter in FIG. 3.
Figure 4B:
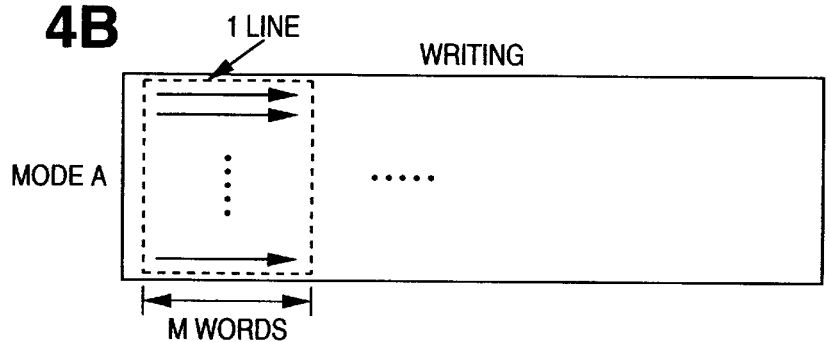
Figure 4C:
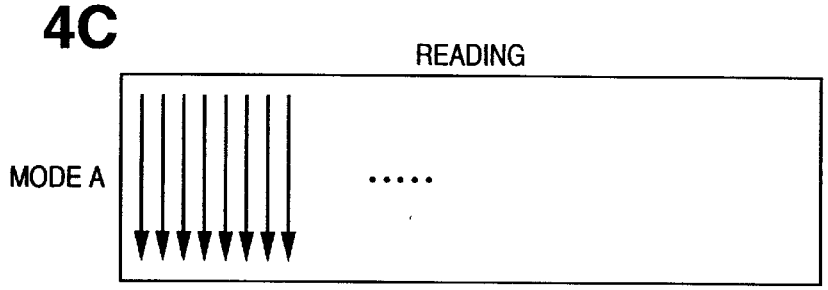
Figure 4D:
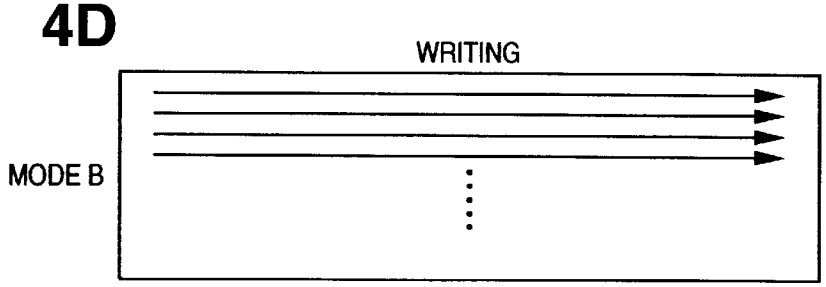
Figure 4E:
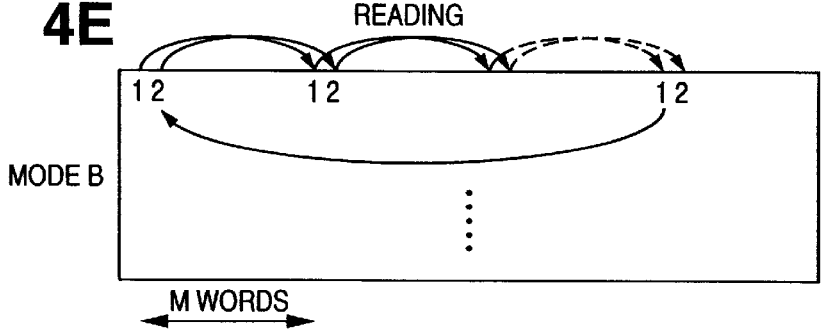
Figure 5:
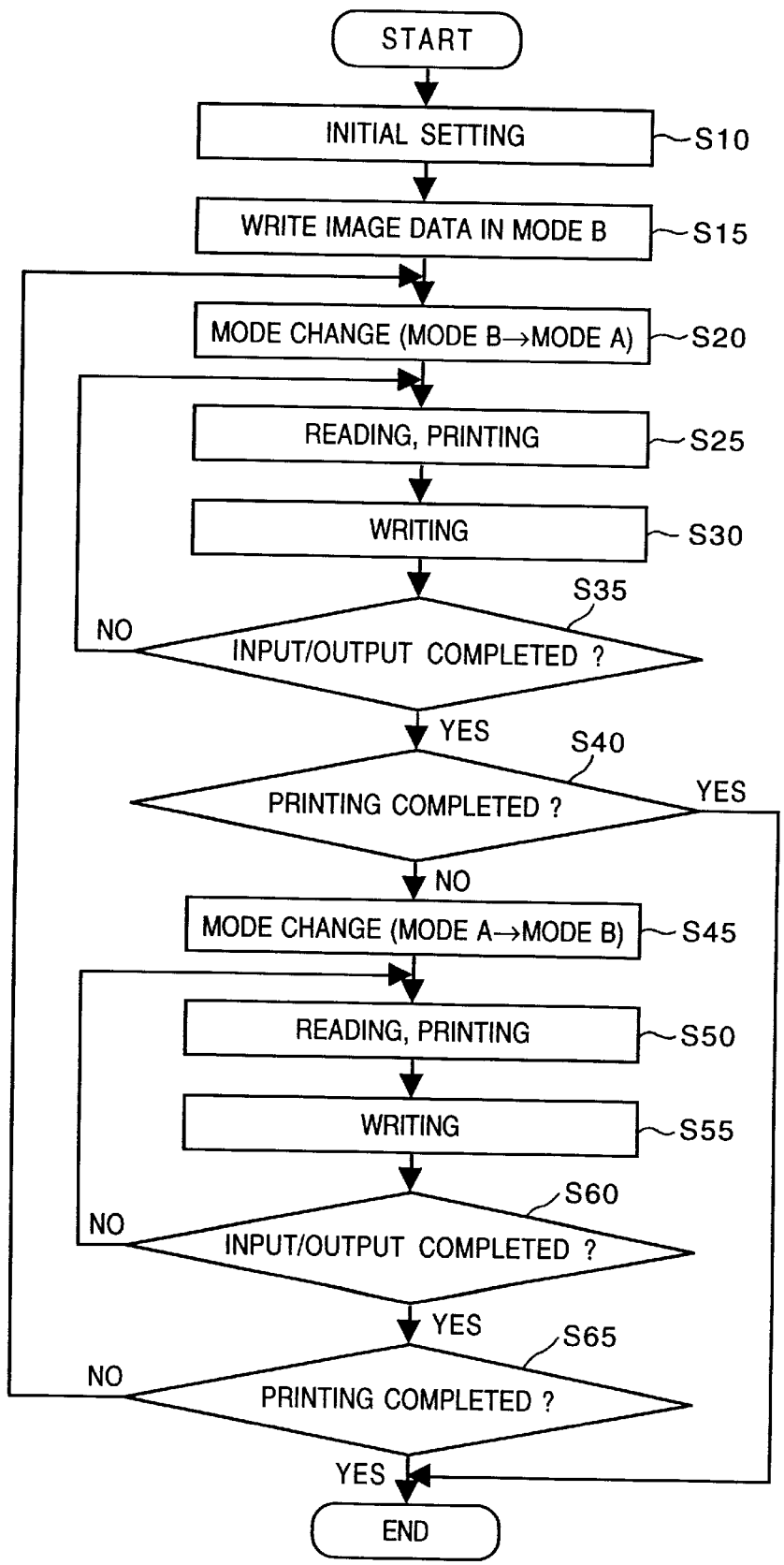
FIG. 5 is a flowchart showing the HV conversion processing.

Next, the HV conversion by using the apparatus having the above construction will be described with reference to FIGS. 4A to 4E showing the concept of the HV conversion and the flowchart of FIG. 5. Note that in the present embodiment, the above-described one buffer is accessed while changing the two modes (mode A and mode B) in printing for one page of print sheet. As shown in FIGS. 4B and 4C, the mode A is an access mode for dividing input one-line image data, arranged in the scanning direction of the printhead IJH, by a M-word length, then writing the image data by M words in the buffer-widthwise direction for N lines (FIG. 4B), and reading the image data by N words in the buffer-widthwise direction (FIG. 4C). On the other hand, as shown in FIGS. 4D and 4E, the mode B is an access mode for sequentially writing input image data, arranged in the scanning direction of the printhead IJH, into the buffer by one line (FIG. 4D), and reading the image data by one word at M-word intervals in the buffer-lengthwise direction (FIG. 4E).

First, at step S10, initial setting of the circuits and the buffers is performed. At this time, all the data in the buffer area are cleared to "0". Next, at step S15, the mode B is set, and as shown in FIG. 4A, image data for N lines is written. At this time, the data is not read out.

At step S20, the mode B is changed to the mode A, and at step S25, as shown in FIG. 4C, image data for N lines (buffer-widthwise direction)×1 word (buffer-lengthwise direction) is read from the buffer, then the image data is outputted via the bit-plane reader 111, and print operation is performed by the printhead IJH. When image data for one line (N×M) or more is read out, then at step S30, image data for one line is written as an N×M block into the area from which the image data for one line was read out as shown in FIG. 4B.

Further, at step S35, it is determined whether or not reading of all the image data stored before the mode change and its related printing operation, and writing of the image data into the entire buffer area (H words×N lines) after the mode change, have been completed. If it is determined that all the operations have not been completed yet, the process returns to step S25, while if it is determined that these operations have been completed, the process proceeds to step S40, at which it is determined whether or not the print operation should be terminated. If it is determined at step S40 that the print operation should be terminated, the process ends. However, if it is determined that the print operation should be continued, the process proceeds to step S45, at which the mode is changed from the mode A to the mode B. Note that as these processings are accompanied with data input/output with respect to the same buffer and print operation by scanning of the printhead IJH, the processings at steps S25 and S30 are synchronized. Accordingly, in a case where the writing has been completed but the print operation has not been completed yet, the next reading operation may be suspended.

When the mode A has been changed to the mode B, the process proceeds to step S50, at which image data is read out by one word at M-word intervals, as shown in FIG. 4E, then the image data is outputted via the bit-plane reader 111, and print operation is performed by the printhead IJH. When image data for one line (N×M) or more has been read out, the process proceeds to step S55, at which image data for one line is written into the area from which the image data has been read out, as shown in FIG. 4D. At step S60, it is determined whether or not reading of all the image data stored before the mode change and its related printing operation, and writing of the image data into the entire buffer area (H words×N lines) after the mode change, have been completed. If it is determined that all the operations have not been completed, the process returns to step S50, while if it is determined that these operations have been completed yet, the process proceeds to step S65.

Note that similar to steps S25 and S30, as the processings at steps S50 and S55 are accompanied with data input/output with respect to the same buffer and print operation by scanning of the printhead IJH, these processing are synchronized. Accordingly, in a case where the writing has been completed but the print operation has not been completed yet, the next reading operation may be suspended.

At step S65, it is determined whether or not print operation for one page has been completed. If it is determined that the print operation has not been completed yet, the process returns to step S20, at which the mode is changed to the other mode and reading and printing are performed, while if it is determined at step S65 that the print operation has been completed, the process ends.

Normally, after the completion of the onescanning print operation by the printhead IJH, time for returning the printhead IJH to its home position or the like is required before the next scan printing starts, therefore, almost no interruption occurs in the print operation by the above processing. Further, if the I/F circuit 15 has an FIFO buffer for storing image data for one line or more, the host computer need not wait to transfer data, even a waiting period corresponding to a reading time for one line is required at the beginning of reading.

As described above, according to the present embodiment, print operation can be performed while executing HV conversion with a single buffer, by changing buffer access modes.

The present invention is not limited to the construction of the HV converter; for example, the HV converter having another construction can be employed. Hereinbelow, four embodiments having similar constructions of the HV converter will be described with reference to FIGS. 6 to 9. Note that in these figures, the elements corresponding to those described in FIGS. 3 and 11 have the same reference numerals and the explanation of these elements will be omitted. In the following embodiments, only the characteristic features will be described.

Second Embodiment

Figure 6:
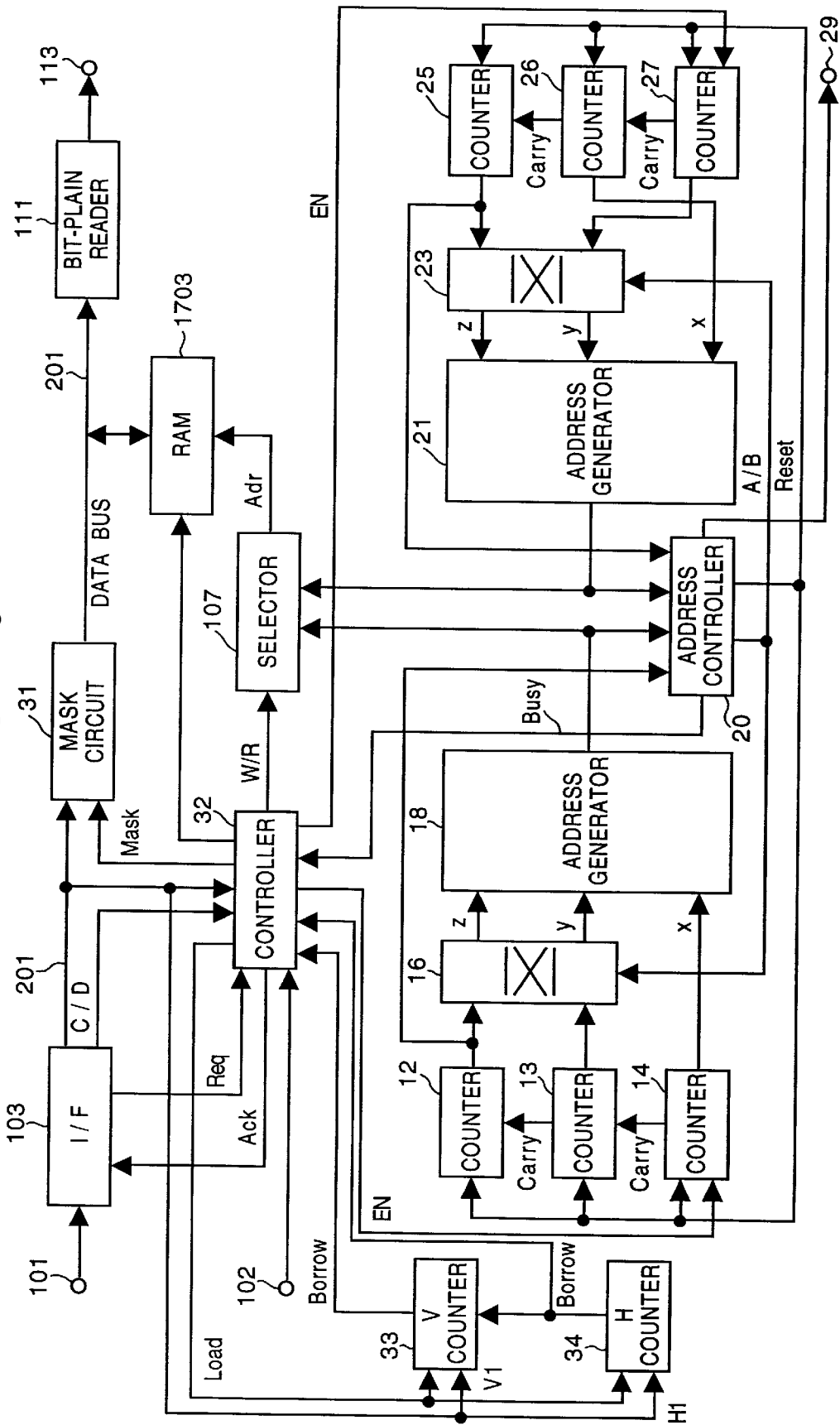
FIG. 6 is a block diagram showing the construction of the HV converter according to a second embodiment.

FIG. 6 is a block diagram showing the construction of the HV converter according to a second embodiment.

In FIG. 6, numeral 31 denotes a mask circuit; 32, a controller; 33, a V counter; and 34, an H counter.

When an image-data transfer command is inputted from the input terminal 101, the I/F circuit 103 outputs a command/data discrimination signal (C/D) and a request signal (Reg) to the controller 32. In response to the request signal, the controller 32 examines the command/data discrimination signal (C/D) and accesses the data bus 201. If the information received by the I/F circuit 103 is an image-data transfer command, the controller 32 outputs an acknowledge signal (Ack) to the I/F circuit 15, and supplies a load signal (Load) to the H counter 34 and the V counter 33 such that the number of words (H1) in the scanning direction of the printhead IJH (main-scanning direction) and the number of lines (V1) in the print-sheet conveying direction (subscanning direction), outputted from the I/F circuit 103, are respectively loaded into the H counter 34 and the V counter 33.

Next, when the image data is inputted from the input terminal 101, the controller 32 stores the image data into the RAM 1703 via the mask circuit 31 by using the request signal and the acknowledge signal, and decrements the count value of the H counter 34. When image data for one line has been stored into the RAM 1703 and the count value of the H counter 34 becomes "0", the H counter 34 outputs a borrow signal (Borrow) to the V counter 33 and the controller 32, so that the count value of the V counter 33 is decremented, and the number of words (H1) in the main-scanning direction is loaded into the H counter 34.

The controller 32 receives the borrow signal, outputs a mask signal (Mask) to the mask circuit 31, and controls the counters 12 to 14, the selector 107 and the RAM 1703 so as to store a value "0" into all the addresses, where input image data is not stored. When all the value "0" has been stored into these addresses, the mask circuit 31 is set to "through" status whereby masking operation is terminated. In the "through" status, input data to he mask circuit 31 becomes output data from the mask circuit 31.

Further, when all the image data has been stored into the RAM 1703, and the count value of the V counter 33 becomes "0", the V counter 33 outputs a borrow signal (Borrow) to the controller 32. The controller 32 receives the borrow signal, outputs the mask signal to the mask circuit 31, and controls the counters 12 to 14, the selector 107 and the RAM 1703 so as to store value "0" into all the addresses of buffer where the input image data is not stored.

According to the above construction, even if the number of lines V of the input image data in the subscanning direction is not an integral multiple of the number of lines (N) of the buffer, otherwise the number of words (H) of one line of the buffer is not an integral multiple of the number of lines (N) of the buffer, the value "0" is stored into the buffer areas where the image data is not stored. This removes the limitation of image data size to be transferred, thus enables more efficient image transfer.

Third Embodiment

Figure 7:
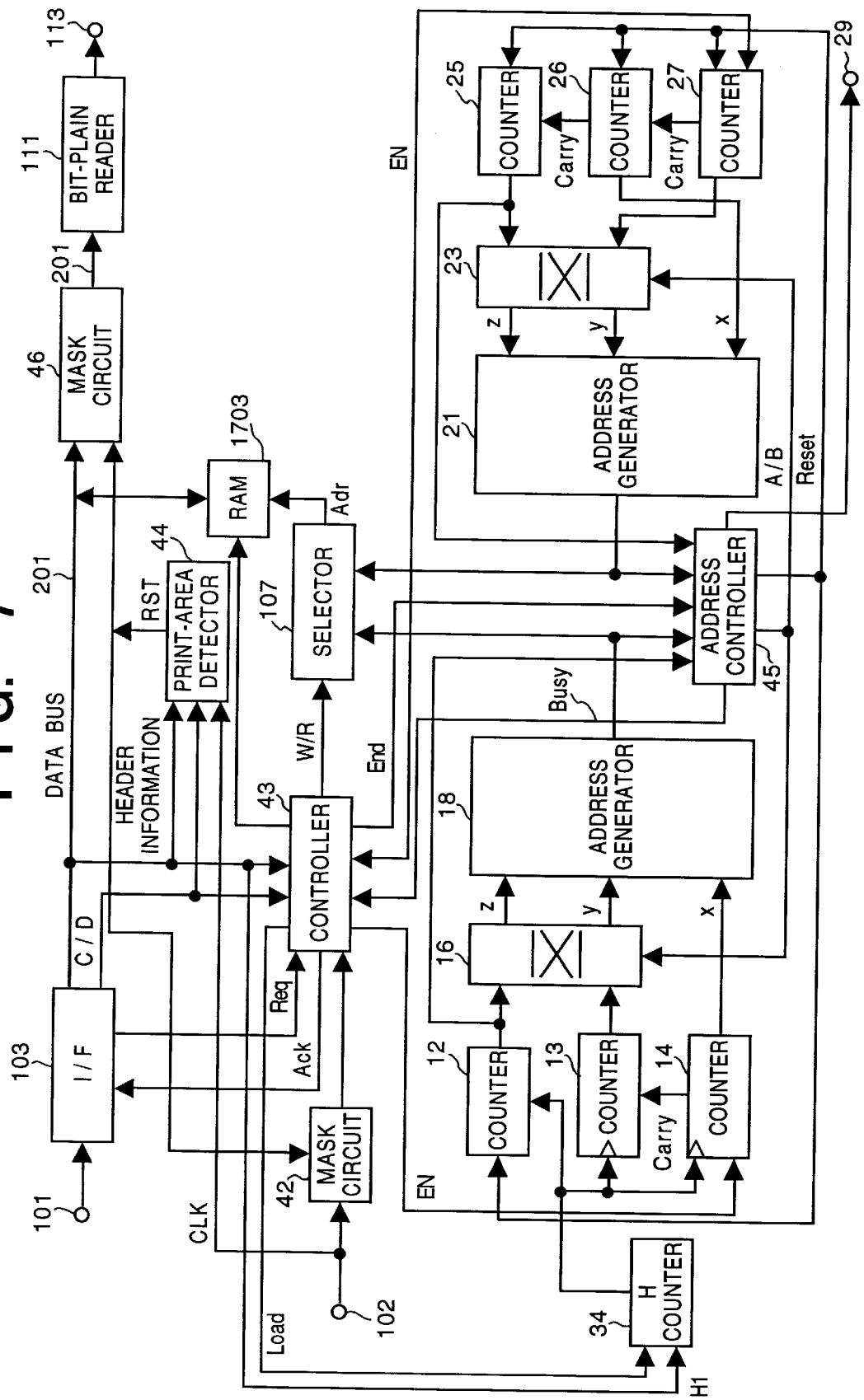
FIG. 7 is a block diagram showing the construction of the HV converter according to a third embodiment.

FIG. 7 is a block diagram showing the construction of the HV converter according to a third embodiment.

In FIG. 7, numerals 42 and 46 denote mask circuits; 43, a controller, 44, a print-area detector; and 45, an address controller.

The print-area detector 44 interprets header information of an input image-data transfer command, and sets a print area for image data. Next, the print-area detector 44 determines the print area of the image data, based on a clock (CLK) inputted from the input terminal 102, and outputs the result of determination (RST) to the mask circuits 42 and 46. The mask circuit 42 masks clocks which do not correspond to the print area in accordance with the determination result from the print-area detector 44. Similarly, the mask circuit 46 sets all the data without the print area to "0" in accordance with the determination result from the print-area detector 44, and outputs the data to the bit-plane reader 111.

When image data for one line has been stored into the RAM 1703, the H counter 34 increments the count value of the counter 12, and resets the count values of the counters 13 and 14.

Similar to the above embodiments, the address controller 45 changes modes by the addresses from the address generators 18 and 21. Upon the final scanning of the printhead IJH, the address controller 45 detects that all the data for the final scanning has been stored into the RAM 1703 by a data-transfer end signal (End) from the controller 43, and performs the mode change.

According to the above construction, a print area is detected based on input image data, and all the data which do not correspond to the print area are set to "0". This avoids storing data which does not correspond to the print area into the RAM, i.e., minimizes the amount of data to be stored into the RAM, thus improves memory use efficiency and image-data transfer efficiency. Further, this saves electric consumption by reduced memory access.

Fourth Embodiment

Figure 8:
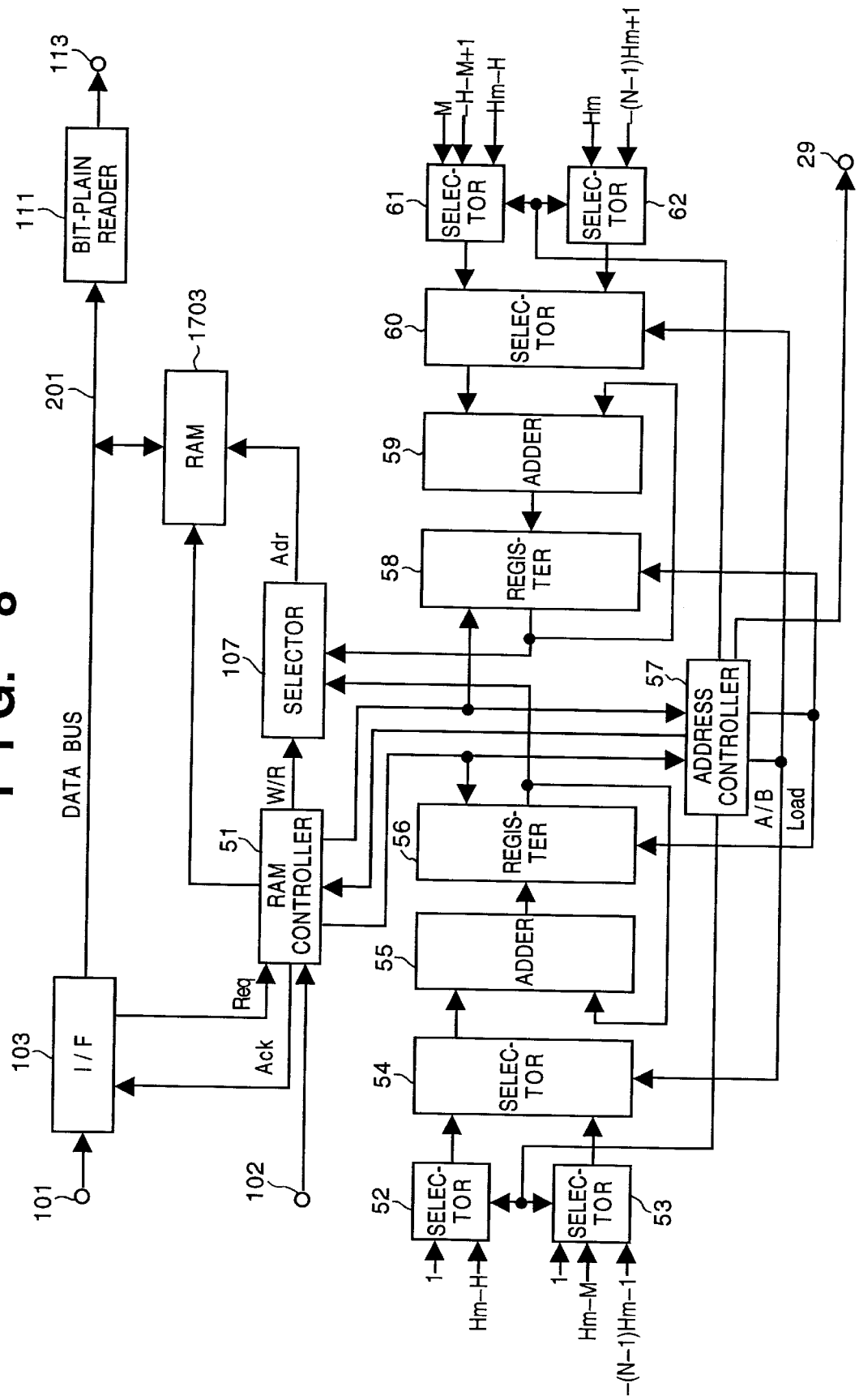
FIG. 8 is a block diagram showing the construction of the HV converter according to a fourth embodiment.
Figure 10A:
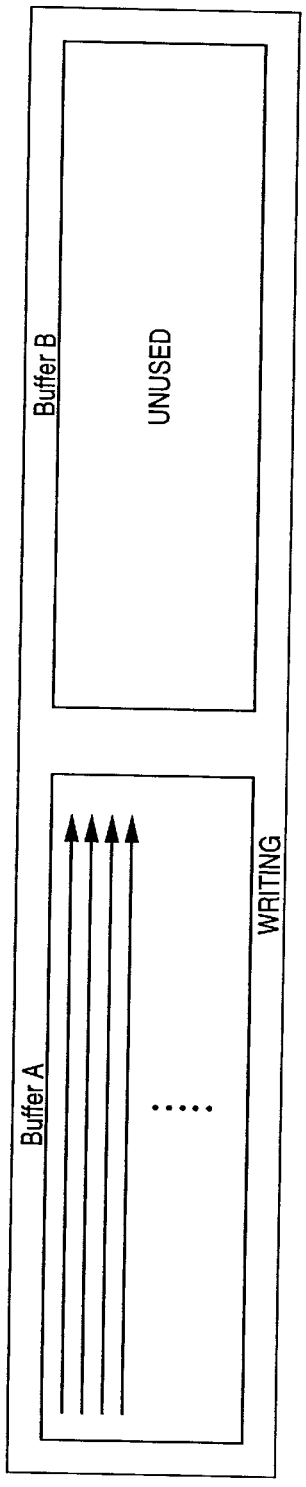
FIGS. 10A to 10C are explanatory views showing buffer access in the HV conversion processing in double-buffer method.
Figure 10B:
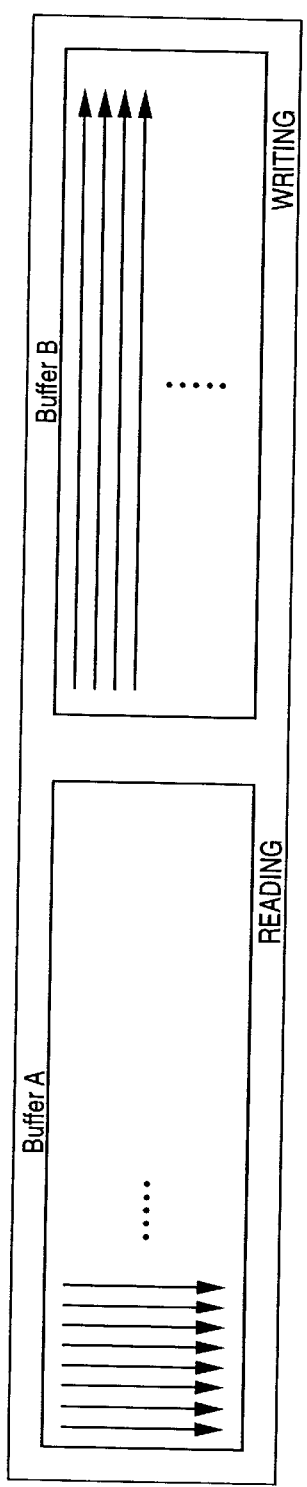
Figure 10C:
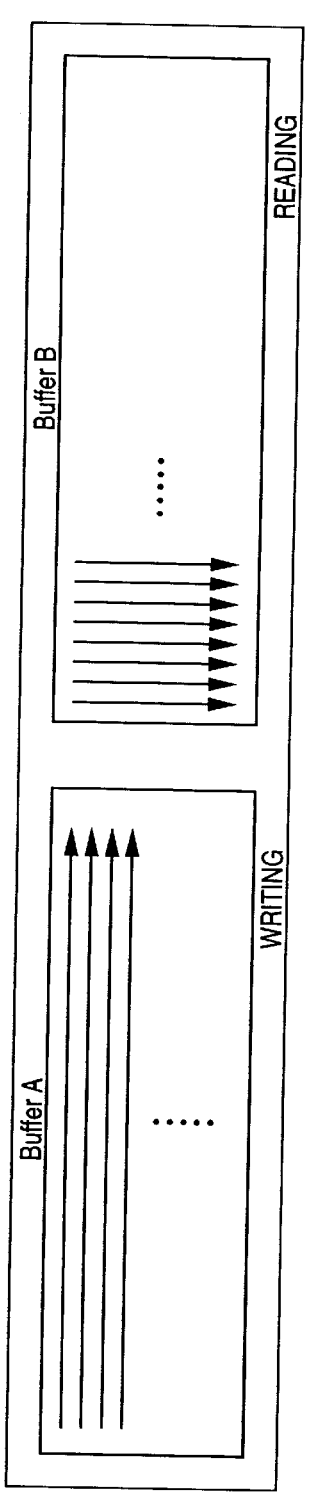

FIG. 8 is a block diagram showing the construction of the HV converter according to a fourth embodiment.

In FIG. 8, numeral 51 denotes a RAM controller; 52 to 54 and 60 to 62, selectors; 55 and 59, adders; 56 and 58, registers; and 57, an address controller.

The selectors 52 to 54 are controlled by the address controller 57. Increment for the next address is outputted from the selector 54. The adder 55 adds the increment to the address of the previous data held in the register 56, and generates an address of the next data. Upon mode change, the register 56 inputs a start address $A_0$ of the buffer, in accordance with a load signal (Load) from the address controller 57. Next, when image data has been stored into the RAM 1703, the register value of the register 56 is updated to the output from the adder 55 in accordance with a control signal from the RAM controller 51.

In this embodiment, it is assumed that the data words for one line of the buffer of the RAM 1703 is Hm. In the mode B, the selector 54 selects the output from the selector 52; the selector 52 outputs the value of (Hm−H) at the end of each line, but outputs "1" at other portion. Accordingly, the output from the register 56 is "$A_0$" at the beginning of the mode B. This value is incremented by "1" from the next pixel data to the end of one line, and becomes "$A_0$+Hm" at the head of the next line. Thus, the image data is stored into the RAM 1703 in the order as shown in FIG. 4D.

Similarly, in the mode A, the selector 54 selects the output from the elector 53; the selector 53 outputs the value of "−(N−1)·Hm+1" at the end of each line and outputs the value of "(Hm−M)" by M words, but outputs "1" at other portion. Accordingly, the output from the register 56 is "$A_0$" at the beginning of the mode A, then incremented by "1" from the next pixel data to (M−1), and incremented by "(Hm−M)" at the M-th word. This value is the address of the next line in the buffer of the RAM 1703. This addressing sequence continues to the end of one line. When the last pixel data of the line has been stored into the RAM 1703, the value is incremented by "−(N−1)·Hm+1" as an address value, into "$A_0$+M". Thus, the image data is stored in the RAM 1703 in the order as shown in FIG. 4B.

On the other hand, on the reading side, the selectors 60 to 62 are controlled by the address controller 57. The increment for the next address is outputted from the selector 60. The adder 59 adds the increment to the address of previous data held in the register 58, and generates an address of the next data. Upon mode change, the register 58 inputs the buffer start address $A_0$, in accordance with the load signal (Load) from the address controller 57. Next, when image data is read from the RAM 1703, the register value of the register 58 is updated to the output from the adder 59 in accordance with a control signal from the RAM controller 51.

In the mode A, the selector 60 selects the output from the selector 62. The selector 62 outputs "−(N−1)·Hm+1" by M words, but outputs "Hm" at other word. Accordingly, the output from the register 58 is "$A_0$" at the beginning of the mode A, and incremented by "Hm" from the next pixel data to "(M−1)", for scanning in the buffer-widthwise direction. As "−(N−1)·Hm+1" is added to the output at the M-th word, a data address ($A_0$+1) of the next pixel of the head line of the buffer of the RAM 1703 is generated. Thus, the image data is read from the RAM 1703 in the order as shown in FIG. 4C.

Similarly, in the mode B, the selector 60 selects the output from the selector 61. The selector 61 outputs "(Hm−H)" at the end of each line and "−H+M+1" by N lines, but outputs "M" at other line. Accordingly, the register value of the register 58 is "$A_0$" at the beginning of the mode B, and incremented by "M" from the next pixel data to the "(N−1)th" word. As "−H+M+1" is added to the value at the N-th word, the value becomes the address of the next data ($A_0$+1) of the head line of the buffer of the RAM 1703. This addressing sequence continues by the end of one line. When the last data of the line is read from the RAM 1703, "(Hm−H)" is added to the register value so as to generate the start address Hm of the next line in the buffer of the RAM 1703. Thus, the image data is read from the RAM 1703 in the order as shown in FIG. 4E.

According to the above construction, address control may be performed by the combination of the registers, the adders and the selectors.

Note that if a value "0" is stored into a specific address of the buffer in advance and another selector is provided between the register 58 and the selector 107, image data other than a print area can be masked by forcibly selecting the specific address when ink-discharge operation is not made.

Fifth Embodiment

FIG. 9 is a block diagram showing the construction of the HV converter according to a fifth embodiment.

In FIG. 9, numerals 71 and 75 denote counters; 72 and 74, LUT's; and 73, an address controller.

First, the operation upon writing image data will be described.

The counter 71 is reset upon mode change. When image data is stored into the RAM 1703, the count value of the counter 71 is incremented by an enable signal (EN) from the RAM controller 17. The counter 71 outputs the count value to the LUT 72 and the address controller 73. Addresses of the RAM 1703 corresponding to the respective modes are stored in the LUT 72 in advance. The LUT 72 outputs an access address for the RAM 1703 based on a mode signal (A/B) from the address controller 73 and the count output from the counter 71. The address is inputted into the RAM 1703 via the selector 107, and image data is stored corresponding to the address.

Next, the operation upon reading image data will be described.

The counter 75 is reset upon mode change. When image data is read from the RAM 1703, the count value of the counter 75 is incremented by an enable signal (EN) from the RAM controller 17. The counter 75 outputs the count value to the LUT 74 and the address controller 73. Addresses of the RAM 1703 corresponding to the respective modes are stored in the LUT 74 in advance. The LUT 74 outputs an access address for the RAM 1703 based on the mode signal (A/B) from the address controller 73 and the count output from the counter 75. The output address is inputted into the RAM 1703 via the selector 107, and image data of the address is read out.

The address controller 73 changes modes when image data corresponding to one scan of the printhead IJH has been stored into the RAM 1703. In printing for one page of print sheet, the address controller 73 controls the RAM controller 17 such that the output from the counter 75 is at least one line ahead of the output from the counter 71 in printing operation corresponding to each scanning of the printhead IJH except the first scanning and the final scan. When image data corresponding to one scan of the printhead IJH has been read out, the address controller 73 outputs a busy signal (Busy) from the output terminal 29 to the motor driver 1707, instructing such that the carriage HC stands by at a position just before the next scan starts. When image data corresponding to one scan of the printhead IJH has been stored into the RAM 1703, the address controller 73 stops the output of the busy signal to the motor driver 1707, resets the counters 71 and 75, and changes the modes.

According to the above construction, the access address for the RAM 1703 is generated by using the LUT. If addresses are stored in the LUT in the order of access, any address can be generated in realtime. For example, if a value "0" is stored into a specific address of the RAM 1703, the specific address is set in the LUT 74 and control is made such that the RAM controller 17 always accesses the specific address set in the LUT 74 with respect to image data which does not correspond to a print area and does not cause ink discharge from the printhead IJH, data corresponding to areas out of the print area can be masked.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main unit and can receive an ink from the apparatus main unit upon being mounted on the apparatus main unit or a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the omputer performs a part or entire processes in ccordance with designations of the program codes and ealizes functions according to the above embodiments.

Furthermore, the present invention also includes case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A data processing method for executing data processing of inputting/outputting to/from a data buffer, whose size is H pixels in a first direction and L lines in a second direction, storing image data for H pixels×L lines, comprising:

an initial write-in step of storing image data into said data buffer by H pixels along said first direction for L lines;

a first read-out step of reading the image data from said data buffer by L pixels along said second direction by a predetermined number of pixels in said first direction;

a first write-in step of storing image data into an area of said data buffer, which has become available by reading of said first read-out step, by the predetermined number of pixels along said first direction for L lines;

a first repetition control step of controlling repetition of said first read-out step and said first write-in step until reading of said first read-out step and storing of said first write-in step have been completed with respect to an entire area of said data buffer;

a second read-out step of reading the image data from said data buffer at intervals of the predetermined number of pixels along said first direction;

a second write-in step of storing image data into said data buffer along said first direction for one line; and a second repetition control step of controlling repetition of said second read-out step and said second write-in step until reading of said second read-out step and storing of said second write-in step have been completed with respect to the entire area of said data buffer.

2. The data processing method according to claim 1, further comprising a third repetition control step of controlling repetition of said first read-out, write-in and repetition control steps, and said second read-out, write-in and repetition control steps, until input/output processing of image data for a predetermined amount has been completed.

3. The data processing method according to claim 1, wherein said predetermined number of pixels is H/L.

4. A data processing apparatus for executing data processing of inputting/outputting to/from a data buffer, whose size is H pixels in a first direction and L lines in a second direction, storing image data for H pixels×L lines, comprising:

initial writing means for storing image data into said data buffer by H pixels along said first direction for L lines;

first read-out means for reading the image data from said data buffer by L pixels along said second direction by a predetermined number of pixels in said first direction;

first write-in means for storing image data into an area of said data buffer, which has become available by reading by said first read-out means, by the predetermined number of pixels along said first direction for L lines;

first repetition control means for controlling repetition of said first read-out means and said first write-in means until the reading by said first read-out means and storing by said first write-in means have been completed with respect to an entire area of said data buffer;

second read-out means for reading the image data from said data buffer at intervals of the predetermined number of pixels along said first direction;

second write-in means for storing image data into said data buffer along said first direction for one line; and second repetition control means for controlling repetition of said second read-out means and said second write-in means until reading by said second read-out means and storing by said second write-in means have been completed with respect to the entire area of said data buffer.

5. The data processing apparatus according to claim 4, further comprising third repetition control means for controlling repetition of said first read-out, write-in and repetition control means, and said second read-out, write-in and repetition control means, until input/output processing of image data for a predetermined amount has been completed.

6. The data processing apparatus according to claim 4, wherein said predetermined number of pixels is H/L.

7. The data processing apparatus according to claim 4, wherein a plurality of counters are employed for determining addresses for access to said data buffer by said first read-out means and write-in means and said second read-out means and write-in means.

8. The data processing apparatus according to claim 4, wherein upon writing image data into said data buffer, said first write-in means and second write-in means write blank data into a specific area of said data buffer in a case where continuous operation based on the image data is not necessary.

9. The data processing apparatus according to claim 8, wherein if continuous operation based on the image data is not necessary, said first read-out means and second read-out means read the blank data by accessing the specific area, as an alternative operation.

10. The data processing apparatus according to claim 4, further comprising first difference output means for outputting a difference between write addresses for current image-data writing and previous image-data writing, wherein a write address for subsequent image-data writing is generated from the difference.

11. The data processing apparatus according to claim 10, further comprising second difference output means for outputting a difference between addresses for current image-data reading and previous image-data reading, wherein a read address for subsequent image-data reading is generated from the difference.

12. The data processing apparatus according to claim 4, wherein a plurality of look-up tables are employed for determining addresses for access to said data buffer by said first read-out means and first write-in means and said second read-out means and second write-in means.

13. The data processing apparatus according to claim 4, wherein said first read-out means and second read-out means respectively have:

a counter which counts a number of pixels of image data being read; and a look-up table for converting a count value of said counter into a read address for said data buffer.

14. A printer using a data processing apparatus claimed in claim 4, comprising:

input means for inputting image data in which pixels are arranged in said first direction;

a printhead in which L print elements are arranged in said second direction;

scan means for scanning said printhead in said first direction;

conveyance means for conveying a print medium in said second direction;

change means for changing a first mode for activating said first read-out and first write-in means, and a second mode for activating said second read-out and second write-in means; and change control means for controlling said change means so as to change said first and second modes at each scan by said scan means.

15. The printer according to claim 14, wherein said printhead is an ink-jet printhead for performing printing by discharging ink.

16. The printer according to claim 14, wherein said printhead is a printhead for discharging ink by utilizing thermal energy, and includes thermal energy generators for generating thermal energy to be applied to the ink.

17. A computer program product comprising a computer readable medium having computer program codes, for executing data processing of inputting/outputting to/from a data buffer, whose size is H pixels in a first direction and L lines in a second direction, storing image data for H pixels×L lines, said product including:

initial write-in process procedure codes for executing processing for storing image data into said data buffer by H pixels along said first direction for L lines;

first read-out process procedure codes for executing processing for reading the image data from said data buffer by L pixels along said second direction for a predetermined number of pixels in said first direction;

first write-in process procedure codes for executing processing for storing image data into an area of said data buffer, which has become available by reading of said first read-out processing, by the predetermined number of pixels along said first direction for L lines;

first repetition control process procedure codes for executing processing for controlling repetition of said first read-out processing and said first write-in processing until the reading of said first read-out processing and storing of said first write-in processing have been completed with respect to an entire area of said data buffer;

second read-out process procedure codes for executing processing for reading the image data from said data buffer at intervals of the predetermined number of pixels along said first direction;

second write-in process procedure codes for executing processing for storing image data into said data buffer along said first direction for one line; and second repetition control process procedure codes for executing processing for controlling repetition of said second read-out processing and said second write-in processing until reading of said second read-out process and storing of said second write-in processing have been completed with respect to the entire area of said data buffer.

* * * * *

UNITED STATES PATENT AND TRADEMARK OFFICE
CERTIFICATE OF CORRECTION

PATENT NO. : 5,956,472
DATED : September 21, 1999
INVENTOR(S) : HISASHI ISHIKAWA.

It is certified that error appears in the above-identified patent and that said Letters Patent is hereby corrected as shown below:

COLUMN 6:
    Line 47, "suctionrestoration" should read --suction-restoration--.

COLUMN 11:
    Line 24, "onescanning" should read --one-scanning--.

COLUMN 17:
    Line 34, "omputer" should read --computer.
    Line 35, "ccordance" should read --accordance--.
    Line 36, "ealizes" should read --realized--.
    Line 37, "case" should read --a case--.

Signed and Sealed this

Twentieth Day of June, 2000

Attest:

Q. TODD DICKINSON

*Attesting Officer*       *Director of Patents and Trademarks*